United States Patent [19]
Olson et al.

[11] Patent Number: 5,389,985
[45] Date of Patent: Feb. 14, 1995

[54] IMAGE RECORDING APPARATUS AND REARVIEW CRT THEREFOR

[75] Inventors: Thor A. Olson, Minneapolis; Richard A. Keeney, Eagan, both of Minn.

[73] Assignee: Management Graphics, Inc., Minneapolis, Minn.

[21] Appl. No.: 153,230

[22] Filed: Nov. 15, 1993

[51] Int. Cl.⁶ ............................................. G03B 29/00
[52] U.S. Cl. ................................. 354/76; 313/477 R
[58] Field of Search ................ 354/75, 76; 355/20; 313/473, 477 R

[56] References Cited

U.S. PATENT DOCUMENTS

| Re. 33,973 | 6/1992 | Kriz et al. ................ 354/76 X |
| 2,241,974 | 5/1941 | Anderson et al. ........... 313/477 RX |
| 3,526,800 | 9/1970 | Johnson ..................... 313/473 |

*Primary Examiner*—Howard B. Blankenship
*Attorney, Agent, or Firm*—Barry R. Lipsitz

[57] ABSTRACT

An imaging system such as an image recorder or scanner is provided with a rearview cathode ray tube. A transparent viewport of optical quality is provided along an optical axis of the CRT which is perpendicular to the CRT faceplate and generally centered with respect to the image area. The electron beam used for scanning the images is placed off-axis with respect to the CRT screen. A deflection control system compensates for spherical distortion and for the keystone effect that results from the off-axis placement of the electron gun. The structure of the present invention eliminates halation, thereby improving the dynamic range and contrast achievable for imaging and/or scanning purposes. The phosphor layer used in the CRT is made substantially thicker than in conventional CRTs, thereby reducing blemishes and improving uniformity, resolution and light output. The partial sharing of electron beam and optical paths enables more compact imaging and scanning systems to be provided.

16 Claims, 3 Drawing Sheets

IMAGE RECORDING APPARATUS AND REARVIEW CRT THEREFOR

BACKGROUND OF THE INVENTION

The present invention relates to image recorders for recording images on a substrate, such as photographic film, and more particularly to a rearview cathode ray tube (CRT) that is useful in providing images for recordal with improved dynamic range, higher resolution and fewer errors.

CRTs are well known devices for the electronic display of images. For example, television sets use CRTs to display video images.

CRTs are also used for image generation and scanning purposes in connection with the recordal and reading of text and/or graphic images. Such devices are in widespread use because of the ease with which electron beams can be scanned and converted into visible energy on phosphor screens.

One type of image recorder that utilizes a CRT is known as a film recorder. In such devices, a light beam from a CRT is controlled by a deflection system to scan across a stationary frame of photographic film to expose the film with an image. Typically, the images are generated by a computer for the production of slides, transparencies, photographs or the like. Alternatively, the images can comprise natural images acquired by a scanner or television camera for subsequent processing by a computer.

Known film recorders, such as those sold under the trademarks "SOLITAIRE" and "SAPPHIRE" by Management Graphics, Inc. of Minneapolis, Minn., U.S.A., typically include a CRT for producing a beam, a deflection system for scanning the beam across the face of the CRT, a system control and central processor unit ("CPU") for controlling the deflection system, and a camera (i.e., "film transport"). The latter component may include a film transport body, lens, lens mounting assembly, aperture plate, film plate, and film transport mechanism. The film may be provided in rolls or strips, or in individual sheets.

When used for very high quality imaging functions, such as in film recorders, conventional CRTs exhibit various limitations. One of the most significant limitations is in achieving the dynamic range that exists in photographic film. Typically, CRT images display a 100:1 contrast range between white and black. Film images and film exposure ranges can exceed 1000:1. The primary reason that CRTs do not reach this level is due to the optics of the glass-phosphor interface in the CRT.

Conventional CRTs which are viewed from the front are made of material which is transparent, so that the phosphor screen deposited on the interior of the faceplate can be seen. The material must also hold a vacuum. Glass is typically used for this purpose. However, since glass has an index of refraction different from that of air, internal reflections occur within the glass. These reflections result in an undesirable property known as halation, causing a halo effect around the point at which the electron beam impinges the phosphor. Because phosphor is typically white, the resultant visual flare reduces the overall contrast achievable in the image.

Another limitation in the use of CRTs for producing high quality images is the difficulty of achieving a blemish-free and uniformly bright phosphor screen over the entire image area. Even extremely small blemishes in the phosphor deposition, for example on the order of less than 0.001" can be enough to show as a defect in a recorded or scanned image.

Perfect screens are extremely difficult to fabricate for numerous reasons. One reason is that the phosphor layer must be very thin so that the electrons can penetrate it and the light generated by the phosphor can make it through the remainder of the phosphor and through the glass faceplate for viewing from outside the CRT. The uniform deposition of such a thin layer over a large image area is very difficult. Another significant factor in screen blemishes is the need for a metallic (e.g., aluminum), layer below the phosphor to serve as an anode. The metallic back layer must also be very thin. Known processes for providing such a back layer are very sensitive to contaminants.

It would be advantageous to provide a high resolution imaging display for use in film recorders and the like. Such a display should provide sharper spots and higher light output levels than conventional CRTs. It would be further advantageous to provide such a display that provides the image in a substantially centered relationship with an optical axis thereof, where the axis is substantially perpendicular to the plane in which the image resides. Such a construction should provide for the uniform viewing of an image for recordal by an image recordal or for scanning in an optical scanning apparatus.

The present invention provides a rearview CRT having the aforementioned advantages. Although rearview CRTs have been proposed in the past, they have not been successfully used for high quality image recorders. This is primarily due to the fact that the image viewing port was necessarily offset from the center of the CRT, since the electron gun portion of the CRT and the deflection yoke mounted to the CRT were always placed along the central CRT axis. An example of such a prior art design is provided in U.S. Pat. No. 3,526,800 for "Cathode Ray Tube Having Independent Front and Rear Displays." The CRT disclosed in the prior art patent was proposed for use in monitoring the image on the front of the CRT faceplate, and not to provide high quality image recording.

SUMMARY OF THE INVENTION

In accordance with the present invention, apparatus is provided for recording an image on a substrate such as photographic film. The apparatus comprises a rearview cathode ray vacuum tube having a faceplate. A layer of phosphor is deposited on the faceplate in the interior of the vacuum tube. An optical viewport is provided in the vacuum tube for viewing an image on an image area of the phosphor inside the vacuum tube. The optical viewport is disposed along an optical axis generally perpendicular to the faceplate and generally centered with respect to the image area. Means are mounted in the vacuum tube at a location offset from the optical axis, for generating an electron beam at an acute angle with respect to the optical axis to write the image on the image area of the phosphor. A camera is mounted to view the image through the optical viewport for recordal of the image.

In a preferred embodiment, the apparatus further comprises means for controlling the electron beam generating means to compensate for keystone distortions caused by the offset mounting of the electron beam generator as the image is written onto the phosphor. Further, it is advantageous to provide a phosphor with no more than 10% transmissivity (e.g., a thick phosphor), in order to eliminate the contrast-reducing effects of halation and to reduce the probability of imperfections that could cause a blemish in a recorded image. It is further preferable to provide an opaque faceplate, for example by including an opaque anode layer underneath the phosphor layer.

Apparatus is also provided for scanning an image. A rearview cathode ray vacuum tube having a faceplate is provided. A layer of phosphor is deposited on the faceplate in the interior of the vacuum tube. An optical viewport is provided in the vacuum tube for viewing a scanning window on the phosphor inside the vacuum tube. The optical viewport is disposed along an optical axis generally perpendicular to the faceplate and generally centered with respect to the scanning window. Means are mounted in the vacuum tube offset from the optical axis, for generating an electron beam at an acute angle with respect to the optical axis. The electron beam generating means are controlled to produce a scanning spot within the scanning window of the phosphor. Optical means are provided, including an image carrier mounted along the optical axis. The image carrier is adapted to carry an image to be scanned by the scanning spot exiting from the optical viewport. Sensor means are provided for sensing the scanning spot as it scans an image carried on the image carrier.

Means are provided in the scanning apparatus for controlling the electron beam generating means to compensate for keystone distortions caused by the offset mounting thereof as the image is written onto the phosphor. As in the image recording apparatus, it is preferable for the phosphor to have a transmissivity of no more than 10%. Further, the faceplate can be opaque, for example by including an opaque anode layer underneath the phosphor layer.

A rearview cathode ray tube is also provided in accordance with the present invention. The tube comprises a vacuum tube having a faceplate. A layer of phosphor is deposited on the faceplate in the interior of the vacuum tube. An optical viewport is provided in the vacuum tube for viewing an image on an image area of the phosphor inside the tube. The optical viewport is disposed along an optical axis generally perpendicular to the faceplate and generally centered with respect to the image area. Means are mounted in the vacuum tube offset from the optical axis, for generating an electron beam at an acute angle with respect to the optical axis, in order to write the image on the image area of the phosphor. Preferably, the phosphor transmits less than 10% of the light from the surface impinged by the electron beam to the opposite side thereof, and the faceplate is opaque.

DETAILED DESCRIPTION OF THE PREFERRED EMBODIMENTS

Figure 1:
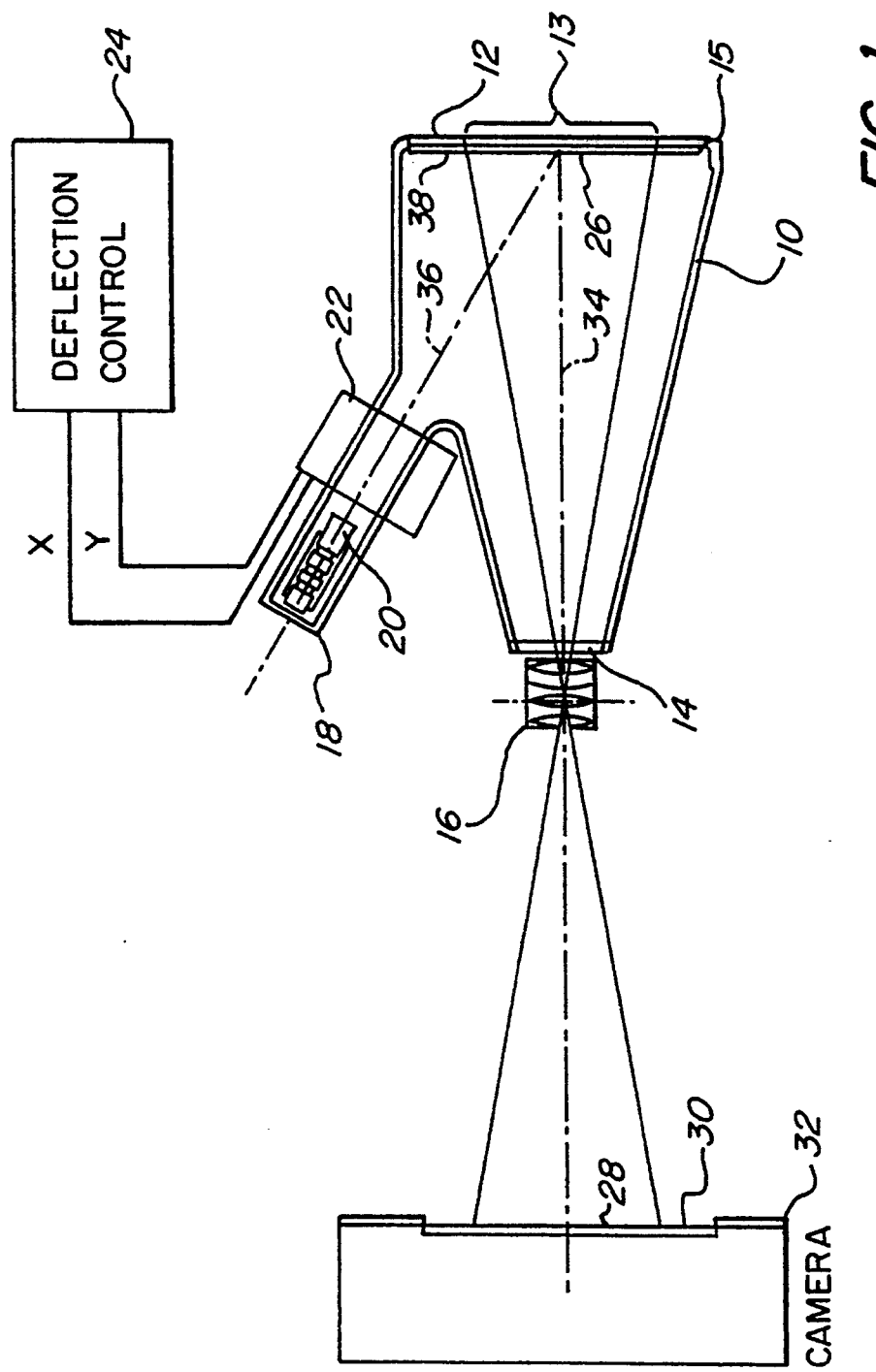
FIG. 1 is a diagrammatic illustration of an image recorder using a rearview CRT in accordance with the present invention.

FIG. 1 illustrates an image recorder in accordance with the present invention. The image recorder uses a unique rearview CRT 10, having an optical viewport 14 along an optical axis 34 which is generally perpendicular to faceplate 12 of CRT 10. Optical axis 34 is generally centered with respect to the image area 13 of the CRT. Phosphor 38 is deposited on the inside of faceplate 12, with an intervening conductive anode layer 15 disposed between the phosphor and the faceplate.

The placement of optical viewport 14 on or near the optical axis 34 allows for standard lenses to be used in scanning or recording applications, without the need to correct for distortion or other effects that occur when imaging or scanning is done too far off of an optical axis. In accordance with the present invention, an electron gun 20, which is normally placed at the rear of the CRT along the axis 34, is offset from the axis 34 along a separate axis 36 that resides at an acute angle with respect to the axis 34. A conventional deflection yoke 22 is placed on CRT extension member 18 to steer the electron beam around axis 36 in order to illuminate the phosphor 38 to produce an image.

The offset relationship of the electron gun 20 with respect to the axis 34 introduces distortions when scanning. However, these distortions can be easily compensated for by the deflection control system 24. A deflection control system that can be used to compensate for such distortions is disclosed in Kriz, et. al. U.S. Pat. No. Re. 33,973 dated Jun. 23, 1992 for "Image Generator Having Automatic Alignment Method and Apparatus," incorporated herein by reference. The apparatus disclosed in the Kriz, et. al. patent deliberately distorts a set of data to provide image precompensation (e.g., keystone and spherical corrections as well as vignette compensation) such that, when a final image is projected or displayed, a true, nondistorted image results.

Figure 2:
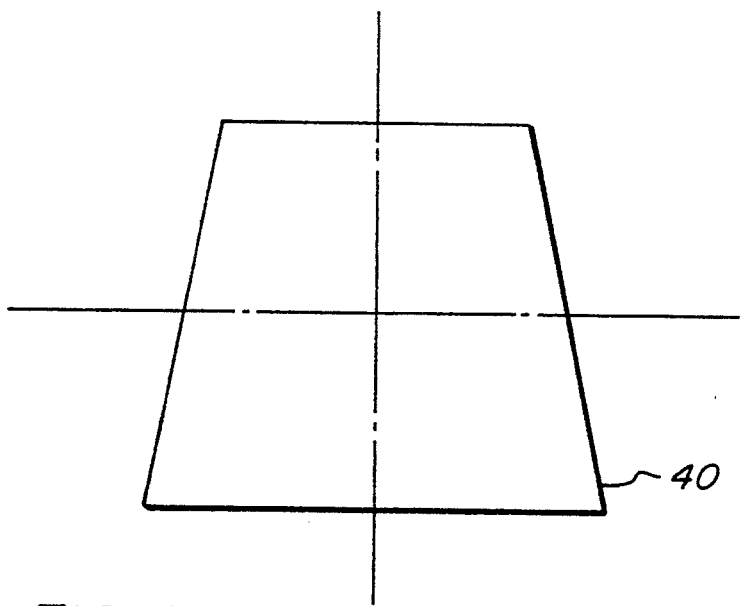
FIG. 2 is a diagram illustrating a typical keystone distortion.

A keystoned raster 40 is illustrated in FIG. 2. To eliminate the keystoning, the deflection system generates the appropriate signals to the deflection yoke so that the resulting raster projected onto the phosphor screen ends up rectangular. The calculation of the geometry and the required control signals for such keystone correction is straightforward, and an example is provided in the aforementioned Kriz, et. al. patent.

Optical window 14 enables an image 26 written onto image area 13 of the phosphor screen 38 to be viewed, via lenses 16, on the same side as the electron beam. Thus, it is no longer necessary to use an extremely thin phosphor layer as in conventional front-view CRTs, since the light does not need to penetrate the phosphor. To the contrary, in the preferred embodiment of the present invention the phosphor is thick enough so that very little of the light penetrates into the faceplate glass, thereby eliminating the contrast-reducing effects of halation. Further, by increasing the thickness of the phosphor, the probability of a small pinhole or other imperfection occurring that could cause a blemish in the image is reduced.

An image written onto phosphor 38 in accordance with the present invention is projected via lenses 16 onto a photographic film 30 or other recording medium contained in a camera 32. In accordance with well known optical principles, the mirror image 28 of the raster image 26 scanned onto the phosphor is received by the recording medium 30.

The rearview CRT arrangement of the present invention requires that the metallization layer not be present on the side of the phosphor 38 which is being viewed. Instead, the conventional CRT metallization layer is eliminated, along with the associated process steps that introduce blemishes. In order to provide the necessary anode for the CRT, a conductive coating 15 can be provided on the inside of glass faceplate 12 prior to phosphor deposition. Since the anode layer provided in accordance with the present invention is not between the electron beam and the optical path, any imperfections in the anode layer will not be visible. Typical small imperfections will not affect the image viewed through the optical viewport 14.

Figure 3:
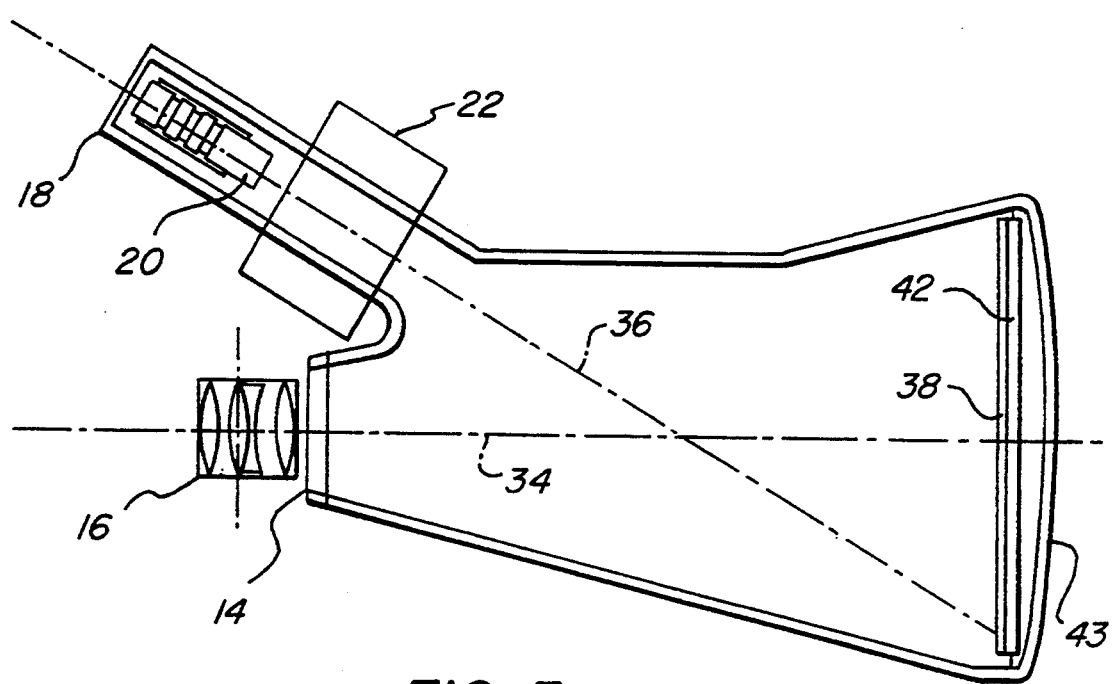
FIG. 3 is an illustration of an alternate embodiment of the rearview CRT in which phosphor is deposited on a separate conductive substrate used as the anode.

Alternatively, a flat conductive substrate 42 (e.g., glass with a thin aluminum layer deposited thereon) can be used for the faceplate as illustrated in FIG. 3, onto which the phosphor layer 38 is deposited. In this embodiment, exterior face 43 of the CRT is not used for imaging and merely defines the exterior boundary of the tube itself. An advantage of the interior faceplate lies in the provision of a flat imaging surface, which is not possible with a conventional CRT that requires a curved exterior face to prevent implosion of the glass structure under vacuum.

FIG. 3 also illustrates a configuration in which the electron beam axis has been moved so that the free fall, undeflected spot from the electron gun 20 lands outside of the normal imaging area of the phosphor screen. This structure eliminates the possibility of burning the phosphor coating when the electron beam is idle.

Figure 4:
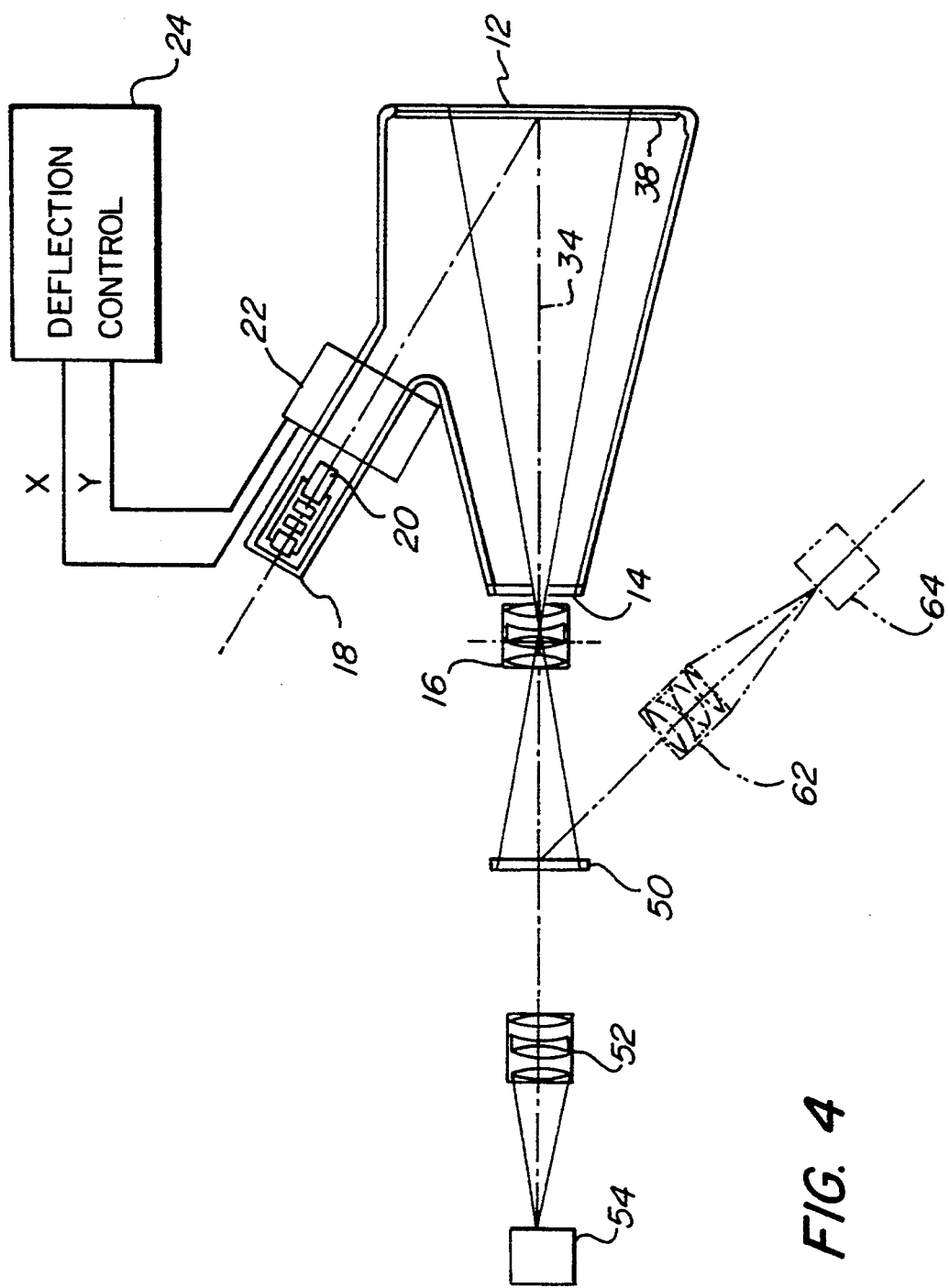
FIG. 4 is a diagrammatic illustration of two alternate embodiments of an image scanning system in accordance with the present invention.

FIG. 4 illustrates an image scanning system in accordance with the present invention. The raster is scanned as in FIG. 1, but instead of scanning an image onto the phosphor, the electron beam is maintained at a full intensity level. This will result in essentially a white picture. By providing a low persistence phosphor, a "flying spot" scanner results. The spot of light which is produced by the phosphor when the electron beam impinges thereon is focused onto a source picture 50, such as a transparency or a motion picture frame. The fraction of light transmitted through the picture 50 is detected by a sensor 54 via lenses 52. The sensor 54 can comprise a well known photodetector. In an alternate embodiment, the source picture 50 comprises reflective media, such as a photographic print. In this case, a sensor 64, which can comprise a standard photodetector, detects the light reflected off of the surface of the picture.

Those skilled in the art will appreciate that the provision of a rearview CRT with an on axis optical viewport in accordance with the present invention provides many advantages. By viewing the image on the same side of the phosphor as the electron beam, the phosphorescent spot is brighter and smaller. The spot is brighter because the conversion from electrons to photons happens near the surface of the phosphor screen and there is less material to absorb the photons in the direction of the viewing optics. In a conventional CRT, the photons must penetrate the remainder of the phosphor layer before they are available for imaging purposes.

The spot is smaller for similar reasons. Since there is less phosphor material in the path, the photons are scattered less. The spot will be closer in size to the actual electron beam size, without the spot-widening effects of scattering. As will be appreciated, a smaller spot will provide improved resolution in the imaging apparatus.

The system of the present invention is further advantageous because the surface on which the image is drawn is contained within a sealed vacuum. Therefore, airborne dust and dirt cannot land on the surface and ruin the picture. This is a common problem with conventional CRT imaging systems, since the screen of the CRT is electrostatically charged and will attract particles to the faceplate.

Another benefit of the present invention is that the imaging system can be provided with a reduced overall package size. Since the electron beam is on the same side of the phosphor as the optical system, the two path lengths partly overlap. In conventional systems, where the electron beam and optical paths are on opposite sides of the screen, this cannot be achieved without the use of mirrors in the optical path.

It should now be appreciated that the present invention provides an improved rearview CRT that has particular applicability in raster image recording applications. The principles of the invention also apply to image scanning systems and vector-based versions of both image recording and image scanning systems. Substantial advantages result by placing the optical viewport along an optical axis of the CRT generally perpendicular to the CRT faceplate and generally centered with respect to the image area. Although displacement of the optical viewport requires the electron gun to be mounted off-axis, the resultant distortions are compensated for by the deflection control system.

Although the invention has been described in connection with various preferred embodiments thereof, those skilled in the art will appreciate that numerous adaptations and modifications may be made thereto without departing from the spirit and scope of the invention as set forth in the claims.

We claim:

1. Apparatus for recording an image on a substrate such as photographic film, comprising:
   a rearview cathode ray vacuum tube having a faceplate;
   a layer of phosphor deposited on said faceplate in the interior of said vacuum tube;
   an optical viewport in said vacuum tube for viewing an image on an image area of said phosphor inside said vacuum tube, said optical viewport disposed along an optical axis generally perpendicular to said faceplate and generally centered with respect to said image area;
   means mounted in said vacuum tube offset from said optical axis, for generating an electron beam at an acute angle with respect to said optical axis to write said image on the image area of said phosphor; and
   a camera mounted to view said image through said optical viewport for recordal of the image.

2. Apparatus in accordance with claim 1 further comprising:
   means for controlling said electron beam generating means to compensate for keystone distortions caused by the offset mounting thereof as said image is written onto said phosphor.

3. Apparatus in accordance with claim 1 wherein said phosphor has a transmissivity of $\leq 10\%$.

4. Apparatus in accordance with claim 1 wherein said faceplate is opaque.

5. Apparatus in accordance with claim 1 wherein said faceplate includes an opaque anode layer underneath said phosphor layer.

6. Apparatus in accordance with claim 1 wherein said faceplate comprises an interior substrate having said phosphor deposited thereon and mounted between said viewing port and an exterior face of said vacuum tube.

7. Apparatus in accordance with claim 6 wherein said faceplate is flat.

8. Apparatus in accordance with claim 1 wherein said faceplate comprises an exterior face of said vacuum tube.

9. Apparatus for scanning an image comprising:
- a rearview cathode ray vacuum tube having a faceplate;
- a layer of phosphor deposited on said faceplate in the interior of said vacuum tube;
- an optical viewport in said vacuum tube for viewing a scanning window on said phosphor inside said vacuum tube, said optical viewport disposed along an optical axis generally perpendicular to said faceplate and generally centered with respect to said scanning window;
- means mounted in said vacuum tube offset from said optical axis, for generating an electron beam at an acute angle with respect to said optical axis;
- means for controlling said electron beam generating means to produce a scanning spot within the scanning window of said phosphor;
- optical means including an image carrier mounted along said optical axis, said image carrier adapted to carry an image to be scanned by said scanning spot exiting said optical viewport; and
- sensor means for sensing said scanning spot as it scans an image carried on said image carrier.

10. Apparatus in accordance with claim 9 further comprising:
- means for controlling said electron beam generating means to compensate for keystone distortions caused by the offset mounting thereof as said image is written onto said phosphor.

11. Apparatus in accordance with claim 9 wherein said phosphor has a transmissivity of $\leq 10\%$.

12. Apparatus in accordance with claim 9 wherein said faceplate is opaque.

13. Apparatus in accordance with claim 9 wherein said faceplate includes an opaque anode layer underneath said phosphor layer.

14. Apparatus in accordance with claim 9 wherein said faceplate comprises an interior substrate having said phosphor deposited thereon and mounted between said viewing port and an exterior face of said vacuum tube.

15. Apparatus in accordance with claim 14 wherein said faceplate is flat.

16. Apparatus in accordance with claim wherein said faceplate comprises an exterior face of said vacuum tube.

* * * * *